Oct. 14, 1969    G. F. GIELOW ET AL    3,472,239
VEHICLE SEAT ASH RECEIVER
Filed Dec. 26, 1967
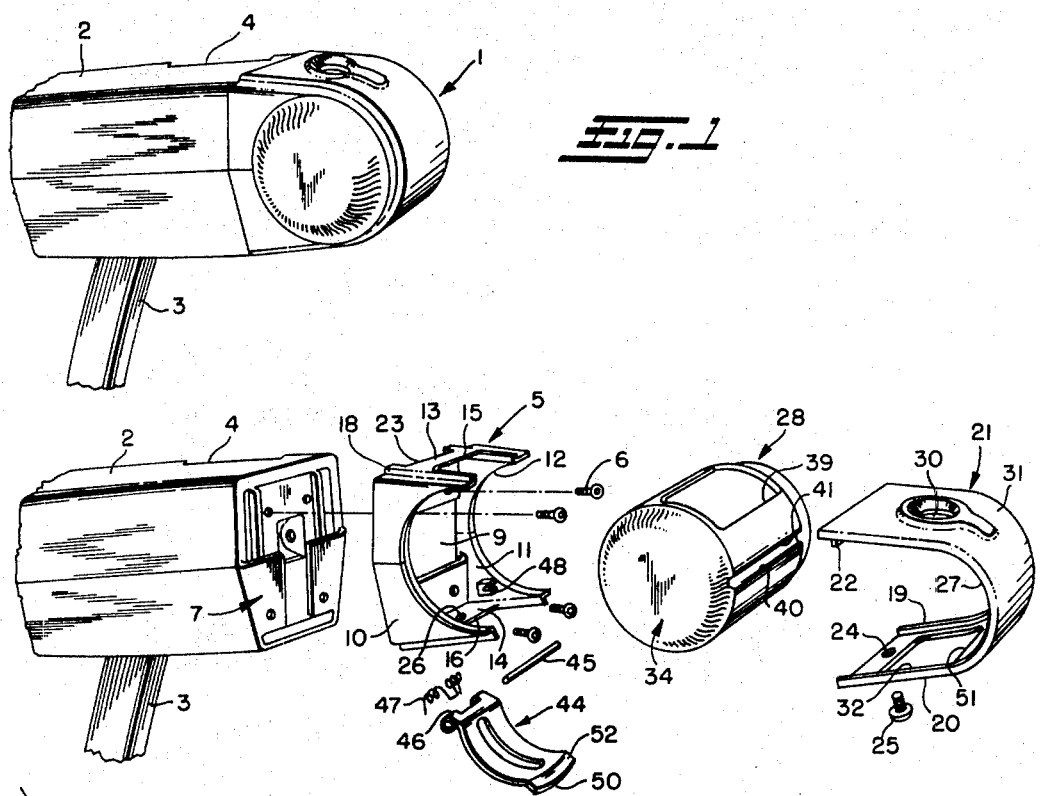
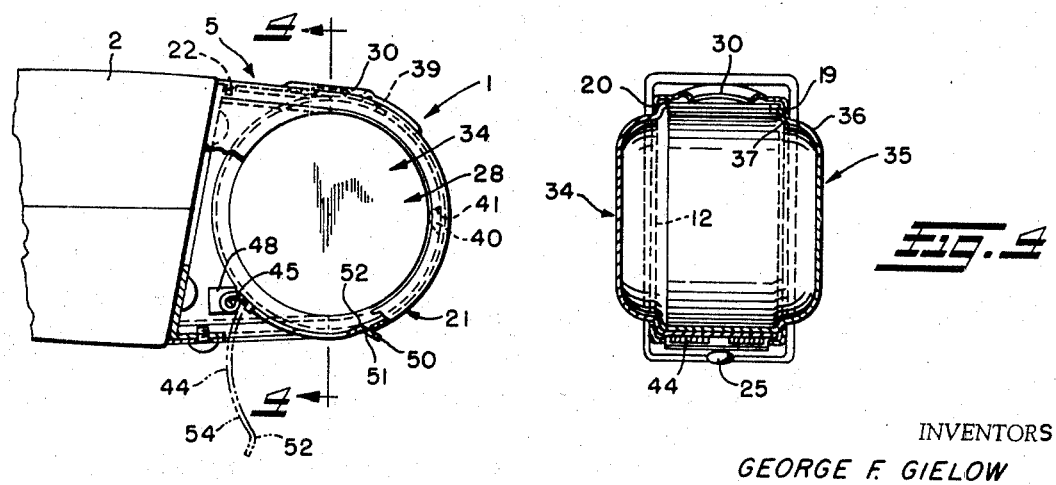
INVENTORS
GEORGE F. GIELOW
ROBERT L. EDWARDS
BY
Oberlin, Maky, Donnelly & Renner
ATTORNEYS

United States Patent Office 3,472,239
Patented Oct. 14, 1969

3,472,239
VEHICLE SEAT ASH RECEIVER
George F. Gielow and Robert L. Edwards, Mansfield, Ohio, assignors to Artnell Company, Chicago, Ill., a corporation of Delaware
Filed Dec. 26, 1967, Ser. No. 693,640
Int. Cl. A24f 19/14
U.S. Cl. 131—235                                6 Claims

ABSTRACT OF THE DISCLOSURE

A vehicle seat ash receiver adapted to be mounted on the end of a seat arm including a generally cylindrical container which can be rotated in its housing, and a stop permitting rotation by the user to open and close the container but preventing rotation to a cleaning or discharge position without release of the stop.

This invention relates generally as indicated to a vehicle seat ash receiver and more particularly to such receiver adapted to be mounted on the end of an arm which can be opened and closed by the user without the contents inadvertently being discharged.

Disagreeable odors and smoke from ash receivers can be a nuisance particularly in vehicle seat ash receivers and especially during relatively lengthy runs. Accordingly, when the ash receiver is not in use, it is desirable to close the same without, of course, discharging the contents. This can, of course, be done with a sliding drawer or retractable type of ash receiver, but it is difficult to provide in the limited space available such an ash receiver and this is especially true in connection with vehicle seat arms which contain operating mechanisms such as the seat reclining device.

It is accordingly a principal object of the present invention to provide a compact and simplified ash receiver adapted to fit on the end of a vehicle seat arm which can be opened and closed at the desire of the user, but which cannot inadvertently be opened for cleaning or discharge of the contents.

Another principal object is the provision of such vehicle seat ash receiver which can readily be opened by maintenance personnel for discharge or cleaning of the contents.

A further object is the provision of a vehicle seat ash receiver having a discharge door which when in the closed position also acts as a stop precluding the ash receiver from being moved to a contents discharge position.

Yet another object is the provision of a vehicle seat ash receiver which requires both the opening of the discharge door and the turning of the container upside down before the contents can be discharged for cleaning.

A still further object is the provision of a vehicle seat ash receiver adapted to be mounted on the end of a vehicle seat arm which provides an aesthetically pleasing arm terminal portion.

Yet another object is the provision of a vehicle seat ash receiver of simplified construction which can readily be removed from and assembled on the end of a vehicle seat arm.

Other objects and advantages of the present invention will become apparent as the following description proceeds.

To the accomplishment of the foregoing and related ends, the invention, then, comprises the features hereinafter fully described, the following description and the annexed drawing setting forth in detail a certain illustrative embodiment of the invention, this being indicative, however, of but one of the various ways in which the principles of the invention may be employed.

In said annexed drawing:
FIG. 1 is a fragmentary perspective view of the ash receiver mounted on the end of a vehicle seat arm;
FIG. 2 is an exploded perspective view illustrating the various components of the vehicle seat ash receiver;
FIG. 3 is a side elevation partially broken away and in section of such vehicle seat ash receiver; and
FIG. 4 is a vertical section of the ash receiver taken substantially on the line 4—4 of FIG. 3.

Referring now more particularly to the drawings and first to FIGS. 1 and 2, it will be seen that the vehicle seat ash receiver shown generally at 1 is mounted on the end of a vehicle seat arm 2 which is supported on strut 3, the arm including an interior recess 4 in which is provided the operator for a seat reclining mechanism in the arm 2.
in number, to clip 77 on the end of the arm 2. The mounting bracket 5 which is secured by suitable fasteners 6, four in number, to clip 77 on the end of the arm 2. The mounting bracket 5 includes a back plate or base 9 from which extend two forward side walls 10 and 11 in which are provided semicircular recesses indicated at 12. Top and bottom walls are provided extending between the side walls as seen at 13 and 14, respectively, each of which are provided with recesses or openings seen at 15 and 16, respectively.

The edges of the top and bottom walls 13 and 14 are provided with outwardly directed shoulders indicated generally at 18 which receive and center the edge flanges 19 and 20 of ash receiver retainer shown generally at 21. The retainer 21 includes an inwardly projecting tongue 22 at its upper inner edge which fits in recess 23 behind the mounting bracket 5. The opposite or lower end of the retainer 21 is provided with an aperture 24 through which screw fastener 25 passes and which is threaded into tapped aperture 26 in the bottom wall 14 of the mounting bracket 5. The flanges 19 and 20, of course, fit on the shoulders 18 of the top and bottom walls of the mounting bracket and the curved inner edge of such flanges as seen at 27 complement the curved recesses 12 in the mounting bracket to provide circular openings in the bracket and retainer assembly in which are journalled the opposite ends of cylindrical ash retainer 28. The top and bottom lineal surfaces of the retainer 21 extend tangential to the circular openings thus formed with the retainer being secured at its top by the tongue and slot 22–23 and at the bottom by the fastener 25. The retainer includes a snuffer opening 30 in the top lineal surface adjacent the forward curved surface 31 and a discharge opening 32 in the bottom lineal surface also adjacent the forward curved surface 31.

As seen in FIG. 4, the container 28 comprises two shells 34 and 35 telescoped together, each of which includes flat ends having rounded portions seen at 36 provided with shoulders 37 which are retained in and journalled within the flanges 19 and 20 cooperating with the circular edges 12 of the mounting bracket 5. The shells in the assembled condition provide a cylindrical container having the rounded end portions 36 which project through the circular openings formed by the retainer and mounting bracket and such container includes a single access opening 39 formed by corresponding recesses in the two telescoped shells. The access opening may, for example, be approximately 1¼ x 1¼ inches. Also formed in the shells is an elongated axially extending groove 40 providing a stop shoulder 41 as seen more clearly in FIG. 2.

A cleanout door 44, seen more clearly in FIGS. 2 and 3, is pivotally mounted on hinge pin 45 which extends through hinge knuckles 46 on the door with coil spring 47 being interposed between the knuckles on the hinge pin urging the door in a counterclockwise direction or to a closed condition as seen in FIGS. 2 and 3. The hinge pin 45 is mounted in pin retainers 48 on the inside of the side walls 10 and 11 of the mounting bracket 5. The access door fits down through the recess 16 in the mounting bracket and through the cleanout opening 32 in the retainer 21 and includes an offset end tab 50 which normally would bear against the outer edge 51 of the opening 32. However, the door is provided with a stop shoulder or abutment 52 which rides against the cylindrical periphery of the container 28. The abutment 52 may be radially inwardly offset with respect to the remaining curved portion of the cleanout door 44 and such abutment functions to engage the stop shoulder 41 as the container is rotated in a clockwise direction as viewed in FIG. 3 to preclude the access opening 39 in the container 28 from becoming aligned with the discharge opening 32 in the retainer 21. It is therefore apparent that rotation of the container 28 in a clockwise direction as viewed in FIG. 3 is limited by the presence of the cleanout door. The user of the ash receiver can, however, rotate the container to a sufficient degree to offset the access opening 39 in the container from the snuffer opening 30 to close the ash receiver following use. The user, however, cannot rotate the container beyond the extent permitted by the engagement of the abutment with the stop shoulder 41.

When it is desired to clean out the ash receiver, maintenance personnel need only open the ash receiver cleanout door 44 to the phantom line position seen at 54 in FIG. 3 thus removing the stop from the path of the container and in this manner permitting the container to be rotated further in a clockwise direction until the opening 39 is aligned with the opening 32 in the retainer 21. The contents of the ash receiver can then readily be dumped through the bottom of the ash receiver through the discharge opening 32. In this manner, the cleanout door serves as a stop which is operative to preclude rotation of the container 28 to align the opening 39 therein with the discharge opening 32 in the housing, but nevertheless permits rotation by the user to open and close the container by either aligning or misaligning the opening 39 in the container with the snuffer opening 30 in the retainer. Only when the door 44 is opened to remove the stop from engagement with the container can the container then be rotated further to its upside down or cleanout position.

We, therefore, particularly point out and distinctly claim as our invention:

1. A vehicle seat ash receiver comprising a housing adapted to be mounted on the end of a seat arm and the like, a generally cylindrical ash container mounted in said housing for axial rotation, there being a single opening in said container, a snuffer opening in said housing and a discharge opening in said housing, and stop means operative to preclude rotation of said container to align the opening therein with the discharge opening in said housing and also permitting rotation by the user to open and close said container with respect to said snuffer opening in said housing.

2. An ash receiver as set forth in claim 1 wherein said stop means comprises a spring loaded door for said discharge opening cooperating with a stop shoulder on said container to align said openings.

3. An ash receiver as set forth in claim 2 wherein said door includes a stop shoulder riding against said container, and said stop shoulder on said container being operative to engage the shoulder on said door to so limit rotation of said container.

4. An ash receiver as set forth in claim 1 wherein said stop means includes abutting stop elements on said container and said housing, and means operative to permit removal of the latter from the path of the former.

5. An ash receiver as set forth in claim 1 wherein said housing includes a mounting bracket and a retainer, the later when secured to the former providing journals for said container.

6. An ash receiver as set forth in claim 1 wherein said container comprises cup-shape shells telescoped together.

References Cited

UNITED STATES PATENTS

| | | | |
|---|---|---|---|
| 1,546,604 | 7/1925 | Nims et al. | 131—241 |
| 2,736,320 | 2/1956 | Roberts | 131—241 X |

FOREIGN PATENTS

| | | |
|---|---|---|
| 697,792 | 11/1930 | France. |
| 256,088 | 8/1926 | Great Britain. |
| 234,189 | 12/1944 | Switzerland. |

JOSEPH S. REICH, Primary Examiner

U.S. Cl. X.R.

131—241; 206—19.5; 232—43.1; 297—194